J. W. BRANNAN.
ROAD GRADER.
APPLICATION FILED MAY 19, 1917.
1,246,862.
Patented Nov. 20, 1917.
2 SHEETS—SHEET 1.
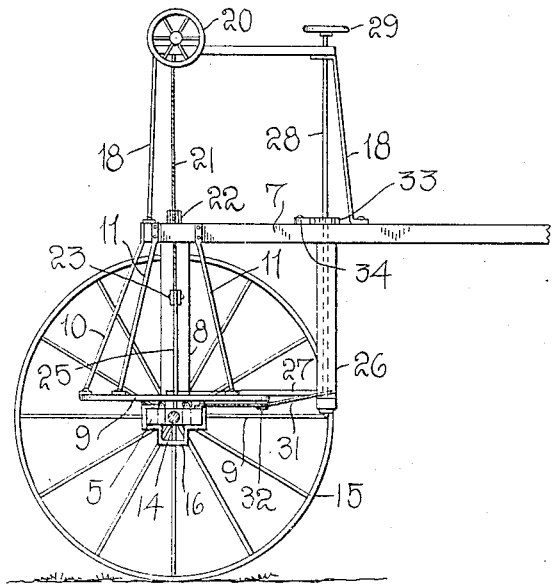
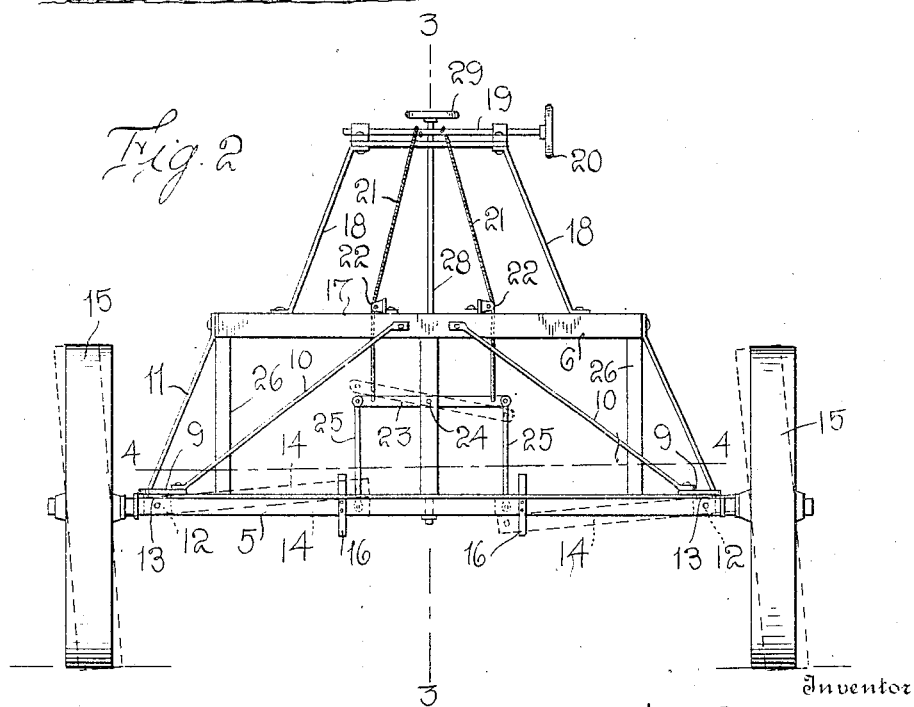
Inventor
J. W. BRANNAN
By Watson E. Coleman
Attorney

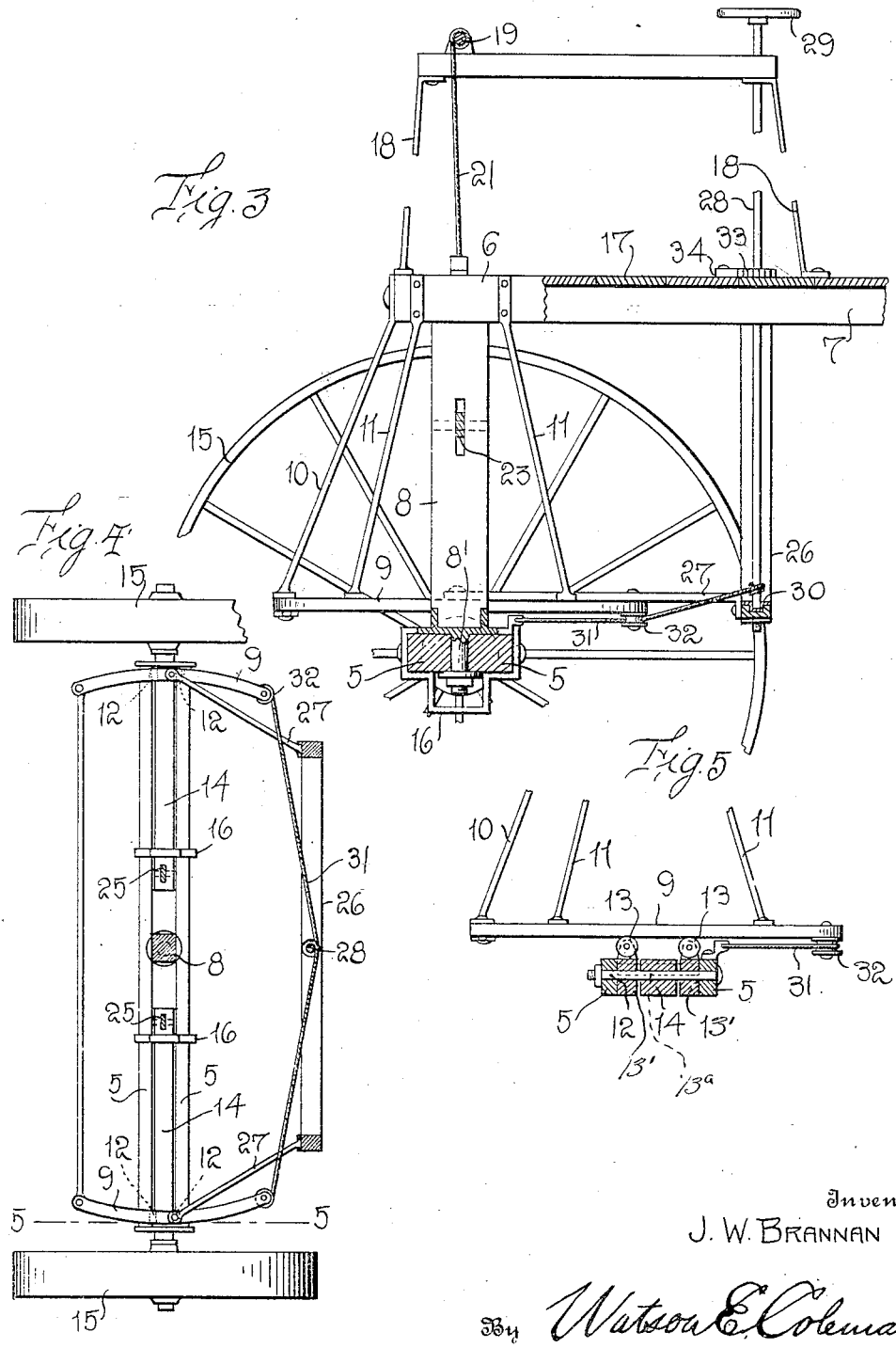

UNITED STATES PATENT OFFICE.

JOHN W. BRANNAN, OF IMPERIAL, NEBRASKA.

ROAD-GRADER.

1,246,862.   Specification of Letters Patent.   Patented Nov. 20, 1917.

Application filed May 19, 1917. Serial No. 169,712.

*To all whom it may concern:*

Be it known that I, JOHN W. BRANNAN, a citizen of the United States, residing at Imperial, in the county of Chase and State of Nebraska, have invented certain new and useful Improvements in Road-Graders, of which the following is a specification, reference being had to the accompanying drawings.

This invention relates to improved steering or guiding means for road graders, and has for its primary object to provide an improved mounting of the supporting wheels and means for moving the same to various vertically inclined positions or angularly disposing the axis of rotation with respect to the line of movement of the machine.

It is also another object of the invention to provide a wheel adjusting mechanism which may be advantageously employed in connection with a four or eight-horse road grader, whereby the draft upon the animals may be greatly lessened by the proper adjustment of the wheels.

And it is a further general object of my invention to materially improve and simplify the construction of devices of the above character, whereby the same are rendered reliable and serviceable in practical use and capable of manufacture at relatively small cost.

With the above and other objects in view, my invention consists in the novel features of construction, combination, and arrangement of parts to be hereinafter more fully described, claimed and illustrated in the accompanying drawings, in which, Figure 1 is a side elevation illustrating the preferred embodiment of my invention, one of the wheels being removed;

Fig. 2 is a rear view;

Fig. 3 is a section taken on the line 3—3 of Fig. 2;

Fig. 4 is a horizontal section taken on the line 4—4 of Fig. 2; and

Fig. 5 is a section taken on the line 5—5 of Fig. 4.

Referring in detail to the drawings, 5 designates the spaced, parallel bars between the outer ends of which the respective wheel axles 14 are pivotally mounted upon the transverse bolts 12. Between the opposite side faces of each axle 14 and the bars 5, the bearing members 13' are arranged and secured to the axle 14 by the bolts indicated at 13ª. Upon each of these bearing members 13', anti-friction rollers 13 are rotatably mounted, said rollers projecting above the upper surface of the rectangular axle 14. 15 designates the ground wheels which are revolubly supported upon the outer ends of the axles 14.

The longitudinally disposed frame bars 7 are connected by means of the transverse bars 6, and an upright 8 is centrally fixed to the latter bar at its upper end and is provided on its lower end with a downwardly projecting pivot rod or bolt 8' to which the spaced bars 5 are centrally connected.

Horizontally disposed, arcuately curved bars 9 rest upon the rollers 13 at opposite ends of the bars 5. Obliquely inclined brace rods 10 connect the rear ends of the bars 9 to the frame bars 6, and additional braces, indicated at 11, also connect said arcuate bars 9 to the side bars 7 of the frame. A suitable platform 17 is secured upon the frame bars 7, and on this platform a support 18 is arranged. A shaft 19 is mounted in suitable bearings upon said support, said shaft being provided upon one end with a hand wheel 20. A pair of chains or cables 21 are connected to said shaft to wind from opposite directions thereon, said cables passing over guide wheels 22 and having their other ends connected to a bar 23 adjacent the respective ends thereof. This bar is pivotally mounted at its center, as at 24, in the upright 8. Rods 25 connect the ends of the bar 23 to the inner ends of the respective axles 14. 16 designates vertically disposed guides fixed to the bars 5, in which the inner ends of the axles 14 are movable. It will thus be apparent that upon rotating the shaft 19 in one direction, one of the chains 21 will be wound upon this shaft while the other chain is unwound therefrom, thus lifting the inner end of one axle and lowering the inner end of the other axle through the medium of the lever 23 and rods 25. This movement of the wheel axles will tilt the wheels 15 to the same angular positions relative to the road surface as shown in dotted lines in Fig. 2, the upper portion of one wheel being moved inwardly toward the frame while the corresponding portion of the other wheel is moved outwardly away from the frame.

A vertically disposed frame 26 is also fixed to the frame bars 7 and depends therefrom, the lower end of said frame 26 being connected by the brace rods 27 to the arcuate bars 9. A vertically disposed rod or shaft 28 extends upwardly through the platform 17 and above the support 18, said rod having a hand wheel 29 on its upper end and being mounted at its lower end in a suitable bearing 30 on the frame 26. Chains 31 are also wound from relatively opposite directions upon this shaft or rod and extend over guide pulleys 32 on the forward ends of the bars 9, the other ends of said chains being connected to the relatively opposite ends of one of the bars 5. A ratchet 33 is fixed upon the rod 28 immediately above the platform 17 and is adapted to be engaged by a pivoted pawl 34, whereby said rod or shaft may be held against reverse turning movement. By rotating this shaft in the proper direction, it is apparent that the bars 5 will be turned upon the bolt 8' on the lower end of the upright, so that the axes of rotation of the wheels 15 may be angularly disposed with respect to the line of movement of the machine. Thus, the movement of the machine may be readily guided or directed and the draft upon the horses or other animals pulling the same considerably lessened.

From the foregoing description, taken in connection with the accompanying drawings, the construction, manner of operation, and several advantages of my invention will be clearly and fully understood. The device as a whole is relatively simple in its construction, not liable to get out of order, and it is also exceedingly strong and durable and capable of manufacture at relatively small cost.

My invention may be employed in connection with various types of road graders, and while I have herein shown and described the preferred construction and arrangement of the several elements, it is of course to be understood that the same are susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

1. The combination of a frame and arcuately disposed bars fixed thereto, individual wheel axles, spaced beams between the ends of which said axles are pivotally mounted for vertical tilting movement, means centrally connecting said beams to the frame and permitting of the horizontal pivotal movement of the beams, ground wheels revolubly mounted upon said axles, antifriction rollers carried by said axles and upon which said arcuate bars are engaged, a lever fulcrumed intermediate of its ends upon the frame, link connections between the ends of said lever and the inner ends of the wheel axles, manually operable means connected to the lever to oscillate the same and move the wheel axles vertically in relatively opposite directions but dispose the wheels in corresponding vertically inclined planes, and additional manually operable means to move the spaced beams horizontally and angularly position the axles with respect to the line of movement of the machine.

2. The combination with a frame having spaced arcuate bars, supporting wheels for the frame each having an axle, bearing members fixed to the opposite side faces of each axle, anti-friction rollers mounted upon the bearing members upon which the arcuate bars are engaged, a vertically disposed shaft rotatably mounted in the frame, flexible elements connected to the shaft at one of their ends and winding in opposite directions thereon, the other ends of said elements being connected to the respective axles, and guides for said chains on the forward ends of said arcuate bars, said axles being shiftable in opposite directions beneath said bars upon the rotation of the shaft to angularly position the wheels with respect to the line of movement of the machine.

In testimony whereof I hereunto affix my signature in the presence of two witnesses.

JOHN W. BRANNAN.

Witnesses:
J. T. JOHNSTON,
D. M. WILEY.